(12) United States Patent
Lanzani et al.

(10) Patent No.: US 10,948,358 B2
(45) Date of Patent: Mar. 16, 2021

(54) FIXING ELEMENT, USE OF A SENSOR INTEGRATED IN THE FIXING ELEMENT AND METHOD FOR DETECTING THE HEAT FLOW INSIDE MECHANICAL ELEMENTS

(71) Applicants: SENS-IN S.r.l., Bologna (IT); ISANIK S.r.l., Azzano Mella (IT)

(72) Inventors: Federico Lanzani, Azzano Mella (IT); Michele Poggipolini, San Lazzaro di Savena (IT)

(73) Assignees: ISANIK S.R.L., Azzano Mella (IT); SENS-IN S.R.L., Bologna (IT)

( * ) Notice: Subject to any disclaimer, the term of this patent is extended or adjusted under 35 U.S.C. 154(b) by 221 days.

(21) Appl. No.: 15/574,383

(22) PCT Filed: May 27, 2016

(86) PCT No.: PCT/IB2016/053142
§ 371 (c)(1),
(2) Date: Nov. 15, 2017

(87) PCT Pub. No.: WO2016/193887
PCT Pub. Date: Dec. 8, 2016

(65) Prior Publication Data
US 2018/0136050 A1    May 17, 2018

(30) Foreign Application Priority Data

May 29, 2015  (IT) .......................... 102015000019098

(51) Int. Cl.
*G01K 7/08* (2006.01)
*F16B 35/00* (2006.01)
(Continued)

(52) U.S. Cl.
CPC ................. *G01K 7/08* (2013.01); *G01K 1/14* (2013.01); *G01K 3/14* (2013.01); *G01K 7/04* (2013.01); *F16B 35/00* (2013.01)

(58) Field of Classification Search
CPC .................................. G01K 7/08; G01K 3/14
See application file for complete search history.

(56) References Cited

U.S. PATENT DOCUMENTS 4,904,091 A * 2/1990 Ward ........................ G01K 1/14
136/230
5,025,914 A * 6/1991 Narushima .............. B23Q 1/34
198/660
(Continued)

FOREIGN PATENT DOCUMENTS

CN       203758647      8/2014
DE       202011004622   6/2011
(Continued)

*Primary Examiner* — Nathaniel T Woodward
*Assistant Examiner* — Philip L Cotey
(74) *Attorney, Agent, or Firm* — Leason Ellis LLP

(57) ABSTRACT

A fixing element, a use of a sensitive element to detect a flow of heat on the inside of mechanical organs; wherein the fixing element, in particular a screw or a stud, has a body and a sensitive element, which is designed to detect a difference of temperature between a first and a second area of the body of the fixing element, so as to determine, as a function of said difference of temperature, a flow of heat that flows through the fixing element and the mechanical organ where it is installed.

13 Claims, 8 Drawing Sheets

(51) Int. Cl.
*G01K 3/14* (2006.01)
*G01K 7/04* (2006.01)
*G01K 1/14* (2021.01)

(56) References Cited

U.S. PATENT DOCUMENTS

| | | | | |
|---|---|---|---|---|
| 5,076,708 | A * | 12/1991 | Pierson | F16H 57/0413 123/196 AB |
| 5,139,345 | A * | 8/1992 | Schafer | G01K 1/08 374/141 |
| 6,550,963 | B2 * | 4/2003 | Daily | G01K 1/026 136/201 |
| 6,942,382 | B2 * | 9/2005 | Demeocq | G01K 7/023 374/179 |
| 2003/0016730 | A1 * | 1/2003 | Daily | G01K 7/04 374/179 |
| 2003/0142721 | A1 | 7/2003 | Hammer et al. | |
| 2003/0180140 | A1 * | 9/2003 | Reigl | F01D 25/243 415/47 |
| 2004/0058588 | A1 * | 3/2004 | Demeocq | G01K 7/023 439/894 |
| 2004/0255998 | A1 * | 12/2004 | Schuh | G01K 7/13 136/224 |
| 2012/0134388 | A1 | 5/2012 | Sawa et al. | |
| 2012/0174665 | A1 * | 7/2012 | Wimberger | G01D 21/02 73/295 |
| 2013/0192352 | A1 * | 8/2013 | Lanzani | G01F 1/6888 73/61.76 |
| 2013/0259090 | A1 * | 10/2013 | Schlipf | G01K 7/02 374/179 |
| 2013/0336359 | A1 * | 12/2013 | Zink | G01K 7/023 374/152 |
| 2014/0373636 | A1 * | 12/2014 | Yang | G01L 1/246 73/761 |
| 2015/0030408 | A1 | 1/2015 | Groche et al. | |
| 2015/0177073 | A1 * | 6/2015 | Lantzsch | G01K 13/00 374/208 |
| 2017/0222115 | A1 * | 8/2017 | Kurihara | G01D 11/30 |

FOREIGN PATENT DOCUMENTS

| | | |
|---|---|---|
| IN | 194381 B | 10/2004 |
| JP | S58-214827 | 12/1983 |
| JP | 60-104739 | 6/1985 |
| JP | 2004296358 A | 10/2004 |
| JP | 2009294157 A | 12/2009 |
| JP | 2018-513935 | 5/2018 |
| JP | 2015-512511 | 12/2018 |
| RU | 112998 U1 | 1/2012 |
| SU | 1008627 A1 | 3/1983 |
| UA | 20143 A | 12/1997 |
| WO | WO 2012/020443 | 2/2012 |
| WO | WO 2015/099933 | 7/2015 |

\* cited by examiner

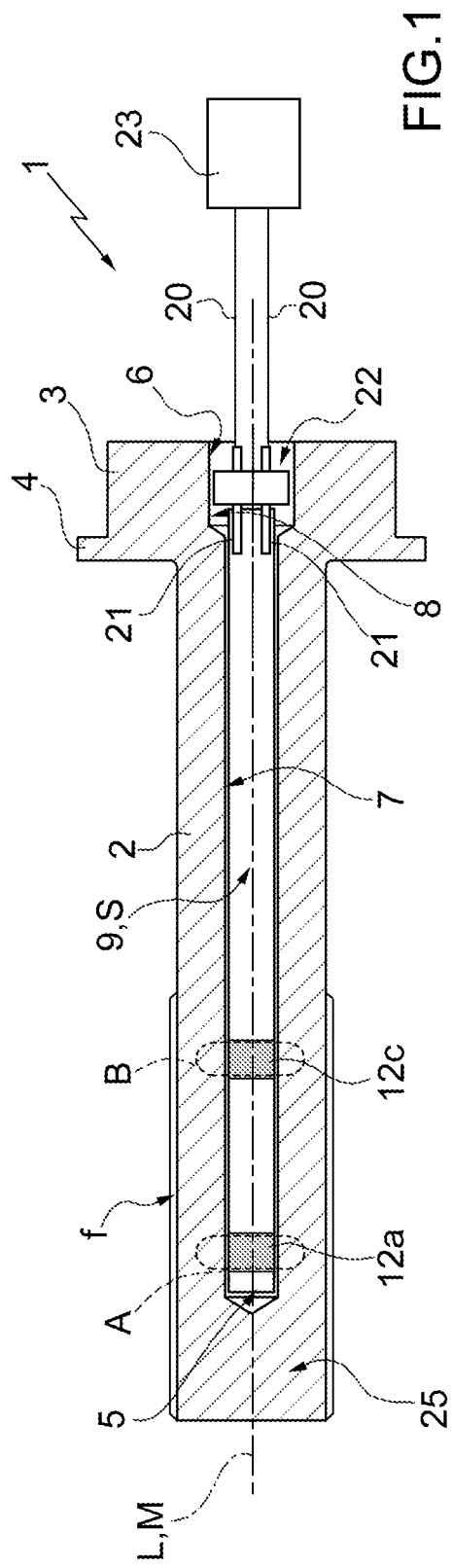
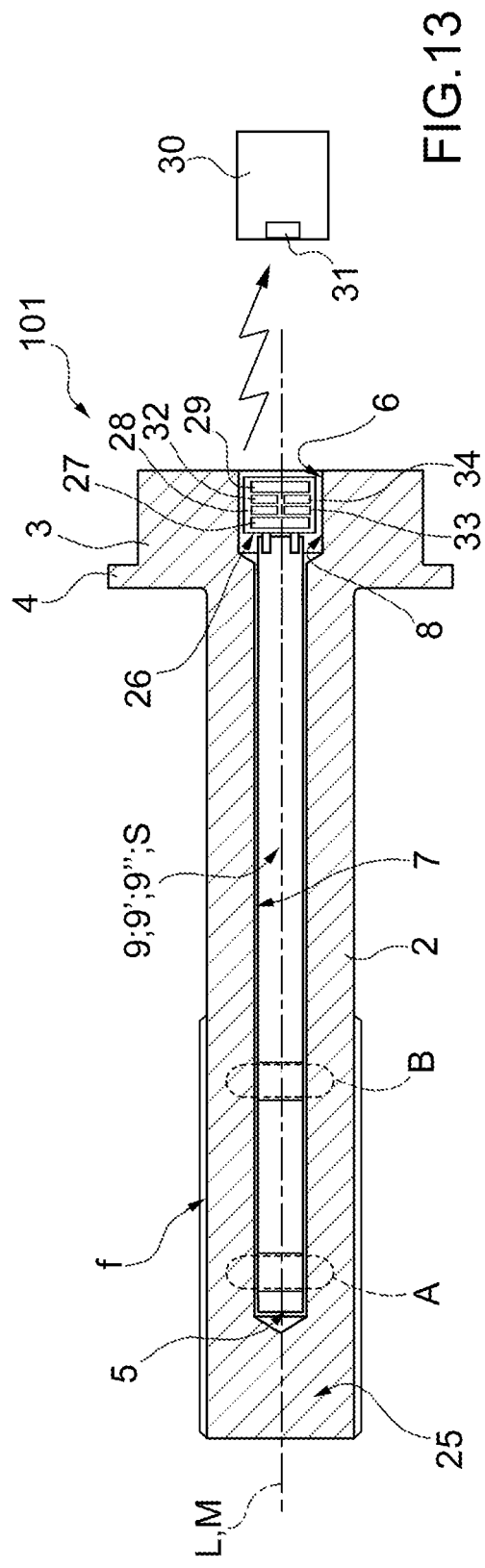

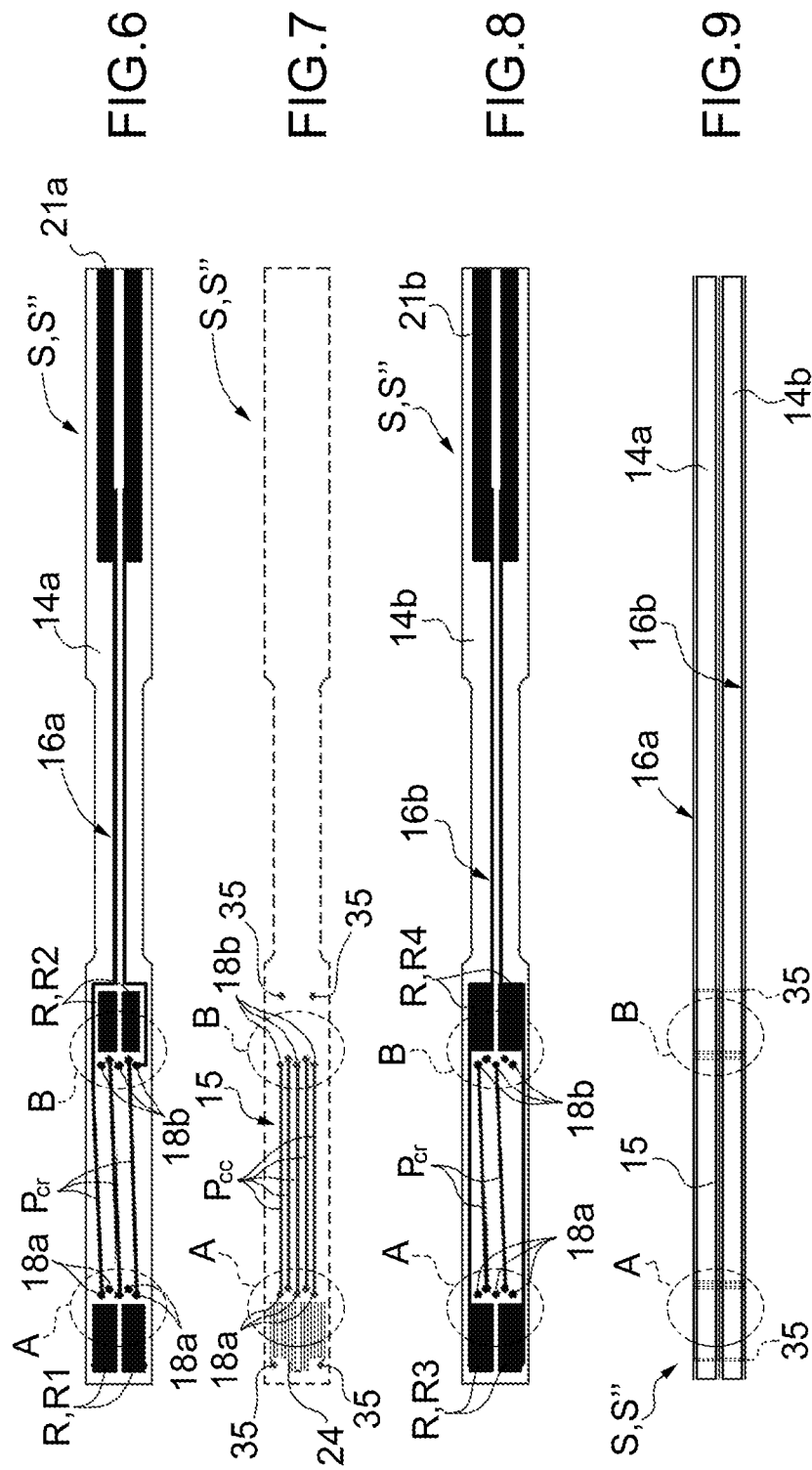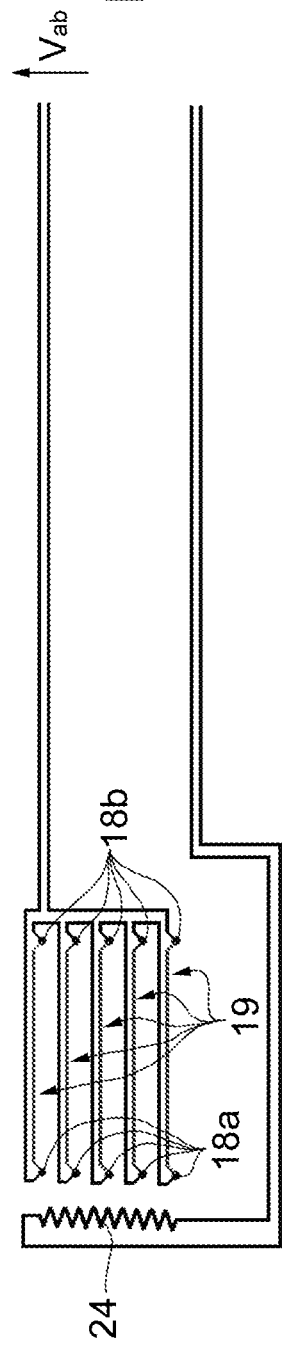

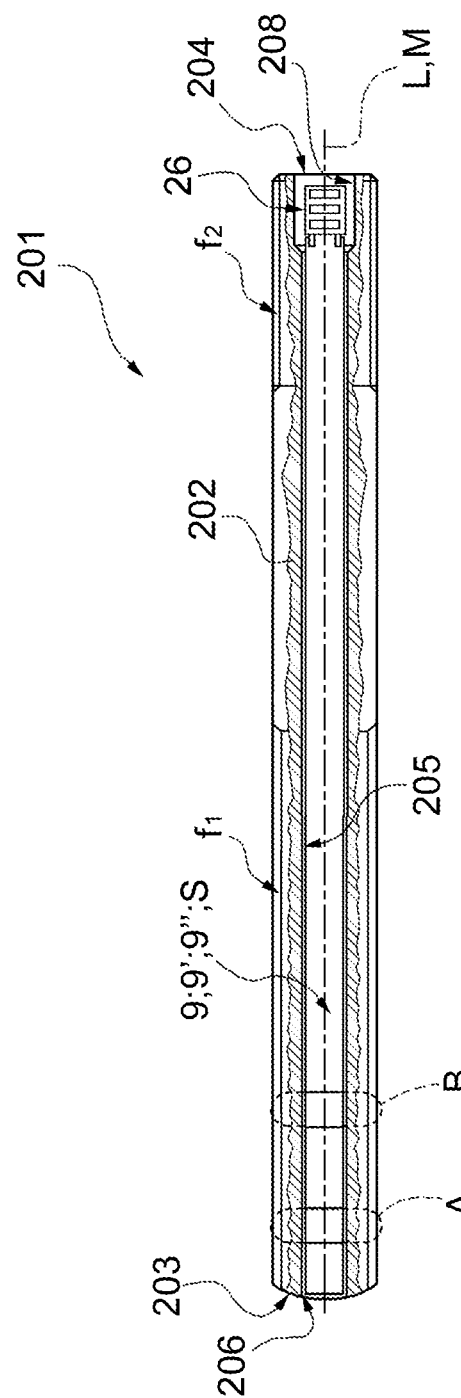

FIXING ELEMENT, USE OF A SENSOR INTEGRATED IN THE FIXING ELEMENT AND METHOD FOR DETECTING THE HEAT FLOW INSIDE MECHANICAL ELEMENTS

CROSS REFERENCE TO RELATED APPLICATIONS

The present application is a U.S. National Phase of International Patent Application PCT/IB2016/053142, filed on May 27, 2016, which claims priority to Italian Application No. 102015000019098, filed on May 29, 2015, each of which is incorporated by reference as if expressly set forth in their respective entireties herein.

TECHNICAL FIELD

This patent application relates to a fixing element, to the use of a sensor built-in in the fixing element and to a method to detect a heat flow on the inside of mechanical organs provided with a fixing element according to the invention.

BACKGROUND ART

The use of sensors is known, which are built-in in screws so as to control the correct tightening and/or the deformations of the screw itself; for example, by means of ultrasound systems or strain gauges.

In case the screws are installed close to engines or areas where there are frictions caused by the relative sliding of two or more mechanical organs (for example, in supports for large bearings or large hubs/transmission organs) known screws are not capable of signalling possibles faults.

To this regard, it should be pointed out that, on the inside of solid bodies of mechanical organs, the heat flow is mainly transmitted through conduction. The streamlines are the trajectories according to which heat is transmitted, through conduction, on the inside of a solid body, from the hottest isotherms towards the coolest isotherms. Since the heat flow is a vector with a direction and a given range, in order to be able to measure this vector, it is necessary to follow the streamlines and understand the value of the difference of temperature along these streamlines.

In particular, an estimation of the heat flow flowing through a mechanical organ can be obtained by measuring the difference of temperature created along a line of propagation of the heat flow.

DISCLOSURE OF INVENTION

An object of the invention is to provide a fixing element comprising a sensing element, which is designed to determine the heat flow on the inside of mechanical organs through the detection of the difference of temperature between two different areas, the sensing element, which is designed to detect the difference of temperature of the fixing element, being positioned close to a significant heat flow. The difference of temperature detected in this way will be strongly correlated with the heat flow.

Advantageously, in order to avoid breaking and/or accidents, monitoring and/or controlling systems should be installed on board vehicles, such as airplanes and cars; said monitoring and/or controlling systems must be able to detect possible operating faults on the inside of or close to engines and mechanical organs. However, in this type of vehicles, due to weight and space reasons, the positioning of dedicated monitoring and/or controlling systems is very difficult, both in case bench tests need to be carried out and during the use of the vehicle.

An object of the invention is to provide a fixing element, which overcomes the drawbacks described above and is capable of monitoring the operation of mechanical organs installed close to a source of heat, such as for example: the combustion chamber of an engine; the presence or the circulation of hot fluids; frictions generated by kinematic couplings or by braking organs.

An object of the invention is to provide a fixing element, which is small and not too heavy and is designed to be applied on the inside of common seats already available in the aforesaid mechanical organs.

In the description below reference is made, in a non-limiting manner, to a fixing element (such as a screw or a stud) comprising a sensing element and to a method to apply said fixing element onto a mechanical organ crossed by a heat flow. Obviously, this sensing element can be built-in in fixing elements other than screws or studs, such as for example tie rods or the like.

An object of the invention is to provide a use of a sensing element built-in in the fixing element and a method to detect a heat flow on the inside of mechanical organs.

According to the invention, there are provided a fixing element, the use of a sensing element and a method according to the appended claims.

BRIEF DESCRIPTION OF THE DRAWINGS

The invention will now be described with reference to the accompanying drawings, which show a non-limiting embodiment thereof, wherein:

FIG. 1 is a view, with a partial axial section, of a fixing element according to the invention;

FIGS. 6 to 8 are plan views of details of a second variant of the sensor according to the invention;

FIG. 9 is a side view of the second variant of the sensor according to the invention;

FIG. 10 is an electrical diagram of the second variant of the sensor according to the invention;

FIG. 13 is a view, with a partial longitudinal section, of a first variant of the fixing element according to the invention;

FIG. 14 is a view, with a partial longitudinal section, of a second variant of the fixing element according to the invention.

BEST MODE FOR CARRYING OUT THE INVENTION

Figure 2:
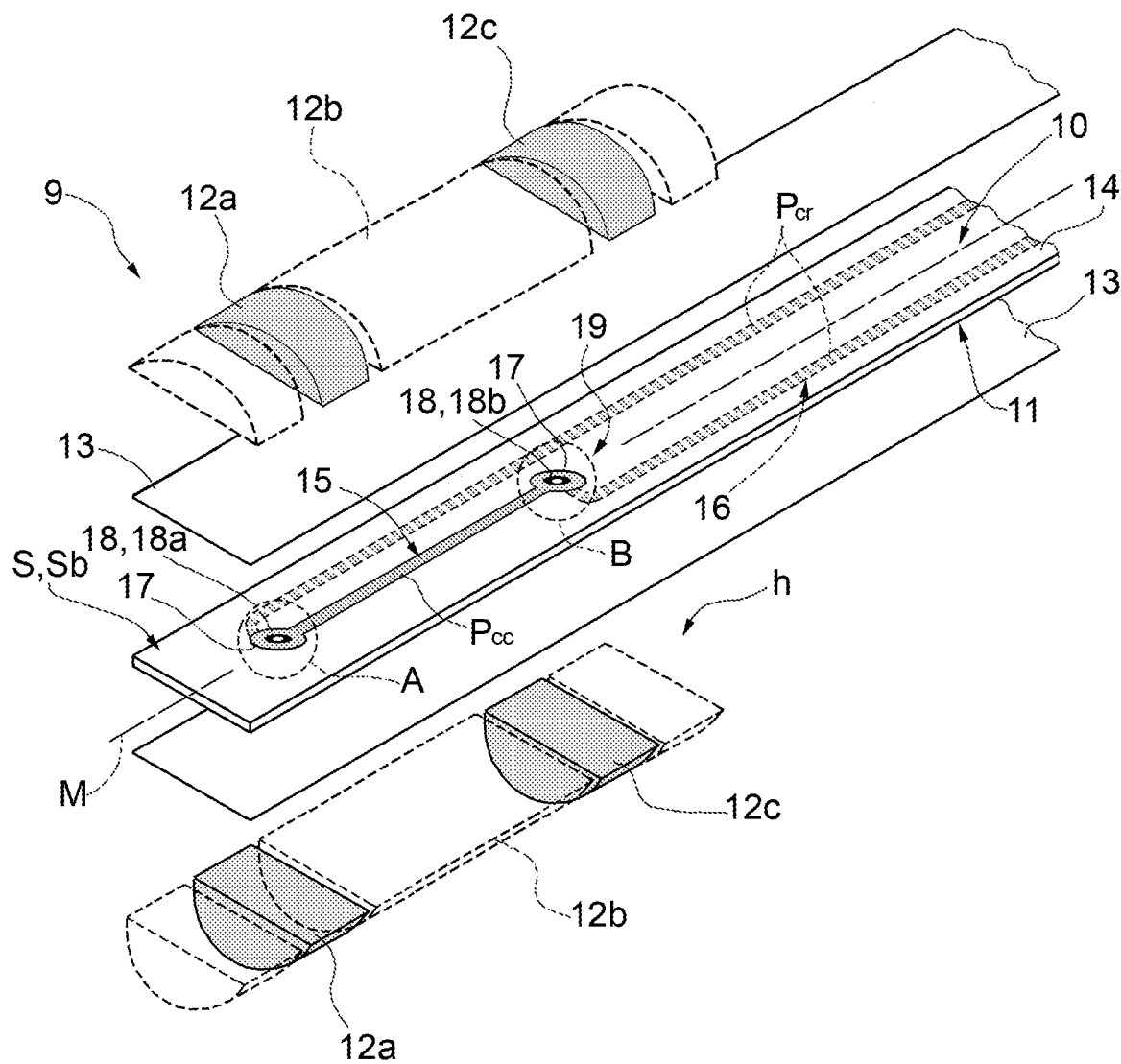
FIG. 2 is an exploded view of a detail of the fixing element of FIG. 1.

In FIG. 1, number 1 indicates, as a whole, a fixing element in the form of a screw 1 comprising a body 2, which is cylindrical and has a longitudinal axis L, and a head 3. According to FIG. 1, the screw 1 comprises, in a known manner, a flange 4, which is built-in in the head 3 and delimits the beginning of the body 2.

Preferably, the screw 1 is made of a material selected within a group of materials with a high mechanical resistance comprising; titanium; nickel-chromium alloys generally known as INCONEL®; X1CrNiMoAlTi12-11-2 stainless steel generally known as MLX17®); X1NiCrMoAlTi12-10-2 stainless steel generally known as MLX19®); precipitation-hardening stainless steel comprised between 13-8 or 15-5 or 17-4; steel with composition Si, 19.00-21.00 Cr, 33.00-37.00 Ni, 9.00-11.00 Mo, 1.00 max. Ti, 0.01 B, 1.00 max Fe, Bal Co generally known as MP35N®; steel comprising nickel and cobalt generally known as MARAGING® and/or VASCOMAX®, for example MARAGING300 or AERMET®100; AISI4340 and AISI304 steel.

The screw 1 has a cavity 5. The cavity 5 is coaxial to the axis L. The cavity 5 extends through the head 3. The cavity 5 is designed to lighten the screw 1, but, at the same time, it does not make it weaker and it does not jeopardize its mechanical resistance in a significant manner. The cavity 5 has a cross section with a circular shape.

The cavity 5 faces the outside of the screw 1 through an opening 6 of the head 3. The cavity 5 has an inner portion 7 and an end portion 8, which extends through the head 3 and is interposed between the inner portion 7 and the opening 6. The inner portion 7 of the cavity 5 has dimensions that are such as to allow it to house, on the inside, a sensing element 9, as described more in detail below. The outer portion 8 has dimensions that are such as to allow it to house a connector 22 or and electronic device 26, as described more in detail below.

Furthermore, the screw 1 has an outer thread f.

Preferably, the end portion 8 of the cavity 5 has a diameter that is greater than the one of the inner portion 7.

The screw 1 comprises a sensing element 9, which is inserted into the cavity 5. The sensing element 9 is designed to detect the difference of temperature between two areas A and B of the screw 1, as described more in detail below. According to FIG. 1, the areas A and B are located along the thread f, but they could also be arranged differently depending on the particular applications of the screw 1. For example, according to a variant that is not shown herein, the area A could be arranged close to the thread f, whereas the area B could be arranged close to the head 3.

Generally speaking, the sensing element 9 comprises a sensor S and means designed to make the temperature of each area A and B and of respective sensing areas of the sensor S uniform.

In FIG. 2, Sb indicates a sensor S comprising a support 14, which is made of an electrically insulating material, and two portions 15, 16, each made of an electrically conductor material, but with different thermoelectric coefficients.

The support 14 has the shape of a thin plate with a longitudinal axis M and has two faces 10 and 11, which are parallel to one another. The support 14 is interposed between the portions 15 and 16. For example, the support 14 is made, in a known manner, of a material selected among the following ones: FR-4 resins, Kapton, PTFE, Polymide, alumina or ceramic. The portions 15 and 16 are made of materials that are suited to form thermoelectric couples; for example, the portion 15 is made of constantan and the portion 16 is made of copper.

Each portion 15 and 16 is applied to a face 10 and 11, respectively, of the support 14. The portion 15 comprises a constantan track Pcc (for example manufactured with the known technique of printed circuits). Similarly, the portion 16 comprises two copper tracks Pcr (for example manufactured with the known technique of printed circuits).

The support 14 has, furthermore, a plurality of metallized through holes 17, generally known as vias (for example manufactured with the known technique of printed circuits). The holes 17 are made close to the ends of the constantan track Pcc. Each end of the constantan track Pcc is in communication with a respective copper track Pcr through a respective metallized hole 17, so as to form thermocouple junctions 18. The thermocouple junctions 18 arranged in correspondence to the area A are indicated as junctions 18a, whereas the thermocouple junctions 18 made in correspondence to the area B are indicated as junctions 18b. The assembly made up of the junction 18a, a constantan track Pcc, the copper tracks Pcr and the junction 18b forms a thermocouple 19.

The sensor Sb comprises, furthermore, connections 21 in the copper-side portion 16 in the form of contact pads and a connector 22 (shown in FIG. 1), which is designed to be connected, through cables 20 and in a known manner, to a control unit 23. The connections 21 are made in the copper side of the sensor Sb, so as to avoid inserting additional thermocouples (copper-constantan junctions); in other words, so as to avoid undesired parasitic junctions.

The sensing element 9 comprises, furthermore, two parts 12a and 12c made of a heat conductor material, which are in thermal contact with the sensor Sb in correspondence to the junction 18a and 18b, respectively.

In case the parts 12a and 12c are made of an electrically conductor material, the sensing element 9 comprises, furthermore, a pair of electrically insulating sheets 13, each applied to a respective face 10 and 11 of the support 14. The electrically insulating sheets 13 are interposed between the sensor Sb and the parts 12a and 12c; alternatively, the electrically insulating sheets 13 can be replaced by insulating coatings applied on the sensor Sb in the areas A and B or on the surface of the parts 12a and 12c, so that the electric circuit of the sensing element 9 is insulated from the parts 12a and 12c.

The parts 12a and 12c are designed to make the temperature of the junctions 18a and 18b and of the areas A and B of the screw 1 uniform.

Preferably, the sensing element 9 comprises parts 12b made of a heat insulating material, for example resin, which are applied on the outside of the sensor Sb and are designed to thermally insulate the parts 12a and 12c from one another and/or to centre the sensor Sb itself on the inside of the cavity 5. According to FIG. 2, the part 12b made of a heat insulating material is longitudinally interposed between the two parts 12a and 12c made of a heat conductor material.

According to FIG. 1, the sensing element 9 is inserted into the cavity 5 and is coaxial to the axis L. The junction 18a and the part 12a are arranged in the area A of the screw 1 (close to the foot 25 of the screw 1), whereas the junction 18b and the part 12c are arranged in the area B. The connector 22 is arranged on the inside of the end portion 8 in the head 3. The dimensions of the inner portion 7 and of the end portion 8 are such as to allow them to house the sensing element 9 and the connector 22.

Figure 3:
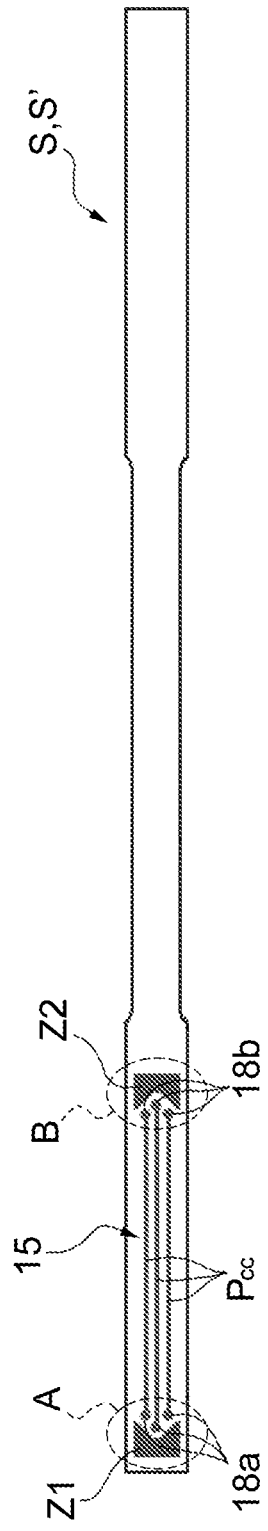
FIGS. 3 and 4 are a plan view and a view from the bottom, respectively, of a first variant of a sensor according to the invention.
Figure 4:
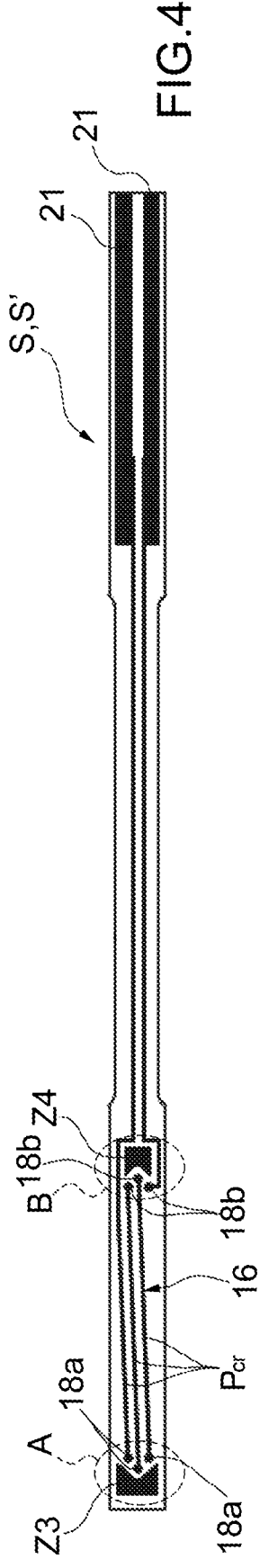

In FIGS. 3 and 4, S' indicates a particular embodiment of the sensor S comprising, in addition to the components already described for the sensor Sb, which maintain the same reference numbers, a plurality of adjacent constantan tracks Pcc, the number of adjacent constantan tracks Pcc is not limiting; in particular, the portion 15 shown in FIG. 3 comprises three constantan tracks Pcc. The portion 15 has, furthermore, a heat conductor area Z1 and a heat conductor area Z2, which are made close to the area A and B, respectively.

According to FIG. 4, the portion 16 comprises a plurality of adjacent copper tracks Pcr, the number of copper tracks Pcr is equal to the number of constantan tracks Pcc. The portion 16 shown in FIG. 4 comprises three copper tracks Pcr. Similarly to portion the portion 15, the portion 16 has, furthermore, a heat conductor area Z3 and a heat conductor area Z4, which are made close to the area A and B, respectively.

The areas Z1, Z2, Z3 and Z4 are optional and are designed to make the temperature in correspondence to the respective areas A and B of the sensor S' as uniform as possible, so as to improve the heat exchange with the areas A and b of the cavity 5.

Figure 5:
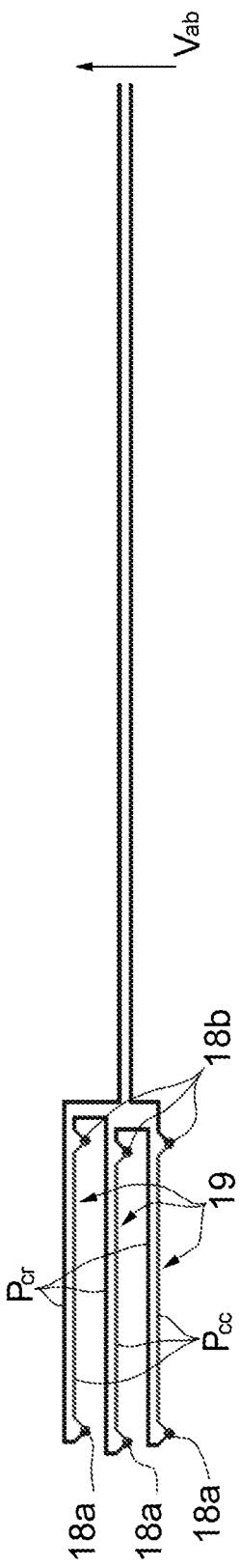
FIG. 5 is an electric diagram of the variant of the sensor shown in FIGS. 3 and 4.

The assembly made up of a junction 18a, the respective constantan and copper tracks Pcc and Pcr and the respective junction 18b forms a thermocouple 19. According to FIGS. 3 and 4, the sensor S' comprises three thermocouples 19, which are connected to one another in series, so as to give a higher signal. FIG. 5 shows the electric diagram of the sensor S' shown in FIGS. 3 and 4.

In FIGS. 6 to 9, S" indicates a further embodiment of the sensor S, wherein the common components already described above for the sensor Sb and S' maintain the same reference numbers. The sensor S" is a multilayer sensor.

In particular, the sensor S" comprises two supports 14a and 14b made of an electrically insulating material and a portion 15 made of an electrically conductor material, which is interposed between the supports 14a and 14b. Preferably, the portion 15 is made of constantan.

The sensor S" comprises two portions 16a and 16b made of copper, which are applied on the support 14a and 14b, respectively. The portion 15 comprises, as a whole, a plurality of constantan tracks Pcc, in particular five. According to FIGS. 6 and 8, the portion 16a has three copper tracks Pcr, whereas the portion 16b has two copper tracks Pcr. The division of the copper tracks Pcr between the portions 16a and 16b makes the distribution of heat on the inside of the sensor S" as uniform as possible. Furthermore, the portions 16a and 16b have connections 21a and 21b, respectively, to external electric units. The sensor S" has five thermocouples.

The portions 16a and 16b have pads R; R1, R2, R3, R4, which are made in the area both of the area A (R1 and R3) and of the area B (R2 and R4). The pads R are heat conductors and are designed to improve the thermal uniformity in correspondence to the respective areas A and B. The pads R are connected to the connections 21b; in particular, the pads R1 and R2 are connected to R3 and R4 through vias 35 shown in FIG. 9.

In addition, the portion 15 comprises a resistor 24, which is arranged close to the area A and is connected to the connections 21b through the vias 35. Optionally, it is possible to install, on the pads, heating resistors, for example surface-mount technology (SMT) resistors, so as to increase the thermal power of the resistor 24.

Preferably, in case of application of the sensor S" on the inside of the sensing element 9, the parts 12a and 12c have an extension that is such as to at least partially cover the pads R; R1, R2, R3, R4 and the resistor 24.

Optionally, it is possible to deactivate the resistor 24 (for example by means of an electric discharge) and provide one or more heating resistors (for example surface-mount technology—SMT—resistors) on one or more selected pads R, depending on the type of application of the screw 1. Similarly or alternatively, it is possible to provide a resistor, i.e. a heating element, close to the area B. According to a variant that is not shown herein, the sensor S" is a multilayer sensor and is not provided with the resistor 24.

FIG. 10 shows the electric diagram of the sensor S" shown in FIGS. 6 and 7.

Advantageously, the sensor S" has the resistor 24 and the thermocouple junctions 18 in a position of symmetry relative to the thickness of the sensor S" itself; therefore, the arrangement of the supports 14a, 14b and of the portion 15 enable the creation of an electric signal Vab available to the connections 21a that is more uniform compared to a single-layer sensor Sb, S', in which a resistor 24 and the junctions 18 are asymmetrical relative to the thickness of the sensor S" itself. Hence, advantageously, the electric signal Vab of the multilayer sensor S" (with or without the resistor 24) is not influenced by the angular position around the axis L and/or of the fixing element 1.

Furthermore, the presence of the resistor 24 enables additional functions, as explained more in detail below.

According to a variant that is not shown herein, the sensing element 9 is pre-assembled in a body with a cylindrical shape and made of resin, which properly houses the sensor S and means to encourage the exchange of heat between the fixing element and the sensor S itself; or the pre-assembled body is inserted into a metal pipe, which is suited to be inserted into the cavity 5.

According to a variant that is not shown herein, the fixing element has an inner cavity that is at least partially rectangular, for example close to the areas A and B. In this case, advantageously, the sensing element 9 does not need the parts 12a and 12c, since the contact with the walls of the fixing element 1 or 101 is ensured by the coupling between the shape of the fixing element 1 or 101 and the shape of the sensor S. The cavity with a rectangular shape can be obtained starting from a circular cavity in which one or more inserts are arranged.

Optionally, the sensor S is directly inserted into the cavity of the fixing element and is fixed close the areas A and B, for example by means of resins. In other words, the sensor S is a sensing element.

According to a variant that is not shown herein, the fixing element has a cavity, which houses the sensor S, which communicates with the outside by means of electric cables. In other words, the fixing element exclusively comprises the sensor S and some electric cables, which project out of the fixing element so as to connect the sensor S to a unit on the outside of the fixing element. In this case, the cavity can be extremely small, as the number of components to be housed on the inside of the fixing element is reduced to a minimum.

According to a variant that is not shown herein, the sensing element 9 or the sensor S comprises a further means to detect the absolute temperature T (for example a resistance thermometer) in a given point of the fixing element 1, 101, 201.

Figure 11:
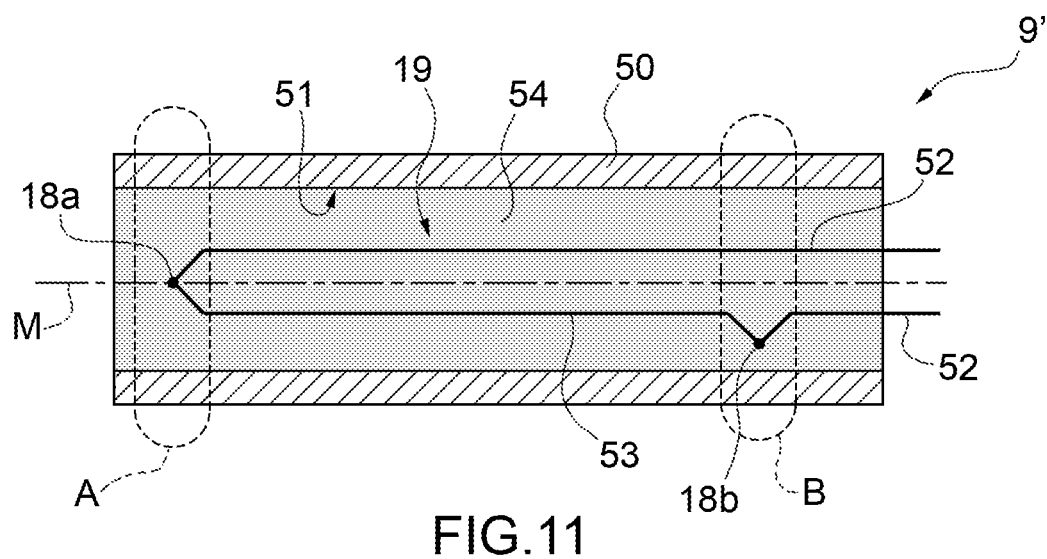
FIG. 11 shows, in a longitudinal section and with parts removed for greater clarity, a first variant of a sensing element according to the invention.
Figure 12:
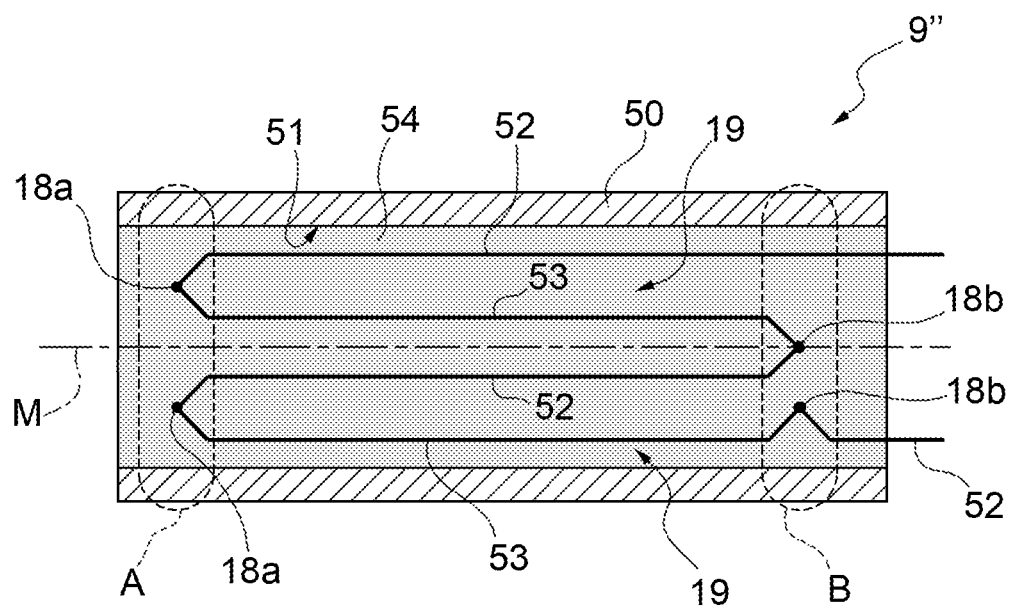
FIG. 12 is similar to FIG. 11 and shows a second variant of the sensing element according to the present invention.

FIGS. 11 and 12 show two variants 9' and 9" of the sensing element 9. According to FIG. 11, the sensing elements 9' and 9" are portions of cylindrical pipes housing portions of metal conductors, which are electrically insulated from one another by a mineral oxide powder. For example, the sensing elements 9' and 9" are manufactured starting from cables for thermocouples insulated by mineral oxides and generally known and marketed under the name of AEROPAK®.

In FIG. 11, number 9' indicates a sensing element 9' comprising an outer tubular body 50 having a longitudinal axis M and a longitudinal inner cavity 51. The sensing element 9' comprises, furthermore, two conductors 52 and a conductor 53, which are at least partly inserted into the cavity 51. The conductors 52 and 53 are wires made of an electrically conductor material. Each conductor 52 is connected to a respective end of the conductor 53, so as to form a thermocouple junction 18a and 18b, respectively, which are designed to be arranged in correspondence to the corresponding areas A and B on the inside of a fixing element 1. The conductors 52 and 53 are made of different materials, in particular materials with different thermoelectric properties. For example, the conductor 52 is made of an Ni—Cr alloy (generally known as Chromel®), whereas the conductor 53 is made of an Ni—Al alloy generally known as Alumel®.

The sensing element 9' comprises, furthermore, a material 54, which is designed to fill the cavity 51 and to electrically insulate the conductors 52 and 53 from one another. For example, the material 54 is a mineral oxide, such as an MgO alloy. The conductors 52 projecting out of the tubular body 50 are connected to a connector (not shown) in a known manner, which is not shown herein. The ends of the tubular body 50 are sealed in a known manner, which is not shown herein.

According to a variant that is not shown herein, the sensing element 9' comprises a further conductor and the conductors 52 and 53 are connected to one another only in correspondence to the thermocouple junction 18a. In this case, the conductors 52 and 53 are connected to an external connector by means of respective intermediate conductors made, for example, of copper. Advantageously, the conductors 52 and 53 are connected to the intermediate conductors in correspondence to the area B, so as to form the thermocouple junction 18b. To this regard, it should be pointed out that, according to the "law of intermediate metals", the junctions with intermediate conductors do not generate effects of parasitic voltages, since they are created very close to one another in correspondence to the area B, which can be considered an isotherm area.

In FIG. 12, number 9" indicates a sensing element 9" similar to the sensing element 9' and, therefore, the components shared with the sensing element 9' maintain the same reference numbers. The sensing element 9" has a plurality of conductors 52 and a plurality of conductors 53, which are connected to one another in series on the inside of the body 50, so as to form a plurality of thermocouple junctions 18a and 18b, which are designed to be arranged in correspondence to the areas A and B of the fixing element 1. In particular, the sensing element 9" shown in FIG. 12 comprises two thermocouple junctions 18a and two thermocouple junctions 18b.

The sensing elements 9' and 9" described above have the advantage of having very small dimensions (their diameters can be smaller than one millimetre); hence, the sensing elements 9' and 9" are especially suited to be applied on the inside of small fixing elements 1.

The sensing elements 9' and 9" have the further advantage of being capable of resisting high temperatures, for example temperatures above 300° C.

According to a variant that is not shown herein, the sensing element 9' or 9" comprises one or more resistors, each arranged close to one or more thermocouple junctions 18a or 18b.

Figure 16:
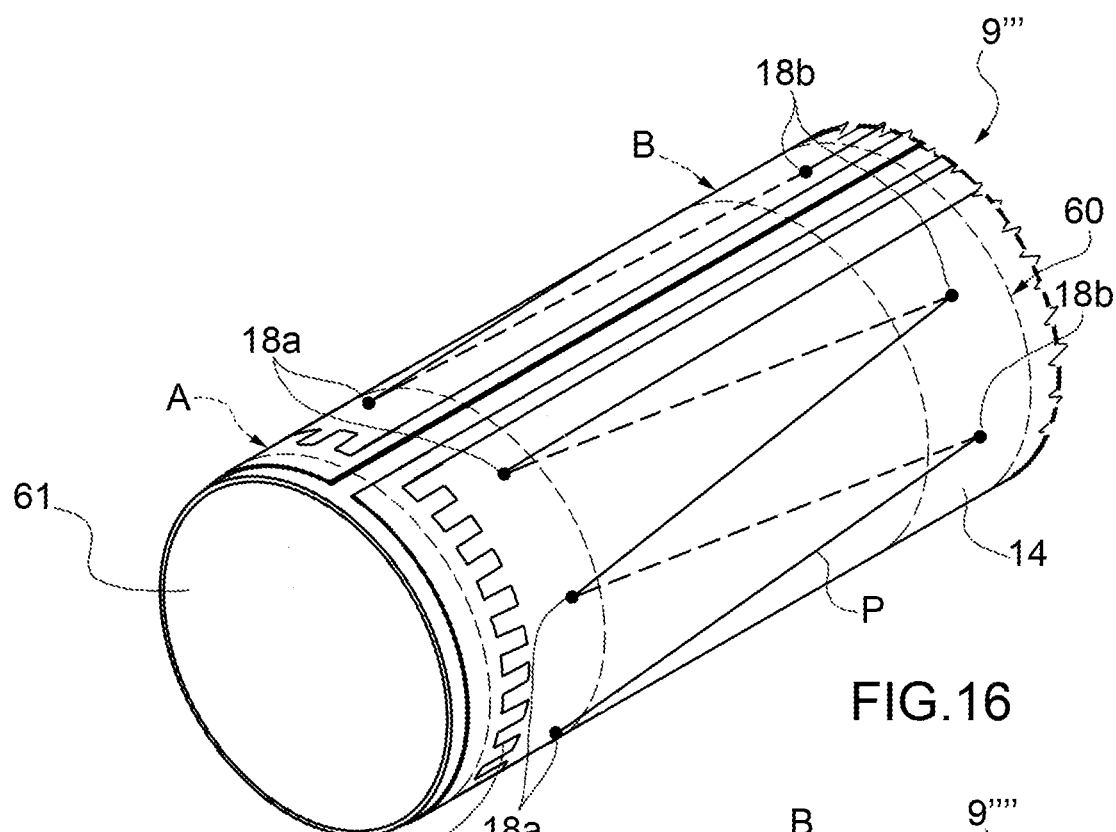
FIG. 16 is an axonometric view of a third variant of the sensing element according to the invention.

In FIG. 16, number 9''' indicates a different embodiment of the sensing element. The sensing element 9''' is similar to the sensing element 9 and, therefore, the components shared with the sensing element 9 maintain the same reference numbers. The sensing element 9''' comprises a flexible, electrically insulating support 14, namely a sheet of material that can be bent onto itself without damaging. Advantageously, the support 14 is bent so as to form a sensing cylinder 60, which is hollow on the inside and can be inserted into the cylindrical cavity of the fixing element 1. By so doing, one can obtain a direct contact with the body 2 of the fixing element 1, thus improving the exchange of heat. The thermocouple junctions 18a and 18b are made on the support 14, so as to be arranged in correspondence to the areas A and B. Obviously, the support 14 can comprise a plurality of thermocouple junctions 18a and 18b for each area A and B, respectively.

Thanks to the cylindrical shape of the support 14, the sensing element 9''' has a greater surface in contact with the fixing element 1, especially in correspondence to the areas A and B; therefore, it is possible to provide a greater number of thermocouple junctions 18a and 18b in correspondence to the area A and B, respectively. In this way, advantageously, the signal Vab is further amplified and, moreover, there is a greater thermal uniformity, as the thermocouple junctions 18a and 18b are uniformly distributed along the circumference of the support 14 of the sensing element 9''' and, as a consequence, they are suited to detect the temperature on the entire circumference of the fixing element 1 in correspondence to an area A and B, respectively.

The support 14 can be a single-layer or a multilayer support. For example, the support 14 can have a multilayer structure like the one shown in FIGS. 3 to 10, namely it can comprise a plurality of supports (14a and 14b in FIGS. 6 to 10).

Advantageously, the support 14 can be manufactured with the technologies of flexible printed circuits or of thin films. Advantageously, the use of the technology of thin films allows manufacturers to obtain supports 14 that are especially resistant to high temperatures.

According to the example shown in FIG. 16, the thermocouple junctions 18a and 18b are through junctions, namely they are made by means of vias, and the support 14 also has tracks P (indifferently made of constantan or copper) facing outwards, namely interposed, in use, between the support 14 and the fixing element 1. Therefore, in this case, the sensing cylinder 60 is advantageously fixed on the inside of the cavity 5 of the fixing element 1 by means of a resin or glue. Advantageously, the cavity 5 is coated with a layer of electrically insulating material (known and not shown), which is designed to be interposed, in use, between the fixing element 1 and the sensing element 9'''. Alternatively, the sensing element 60 is externally coated with an electrically insulating material (not shown).

Figure 17:
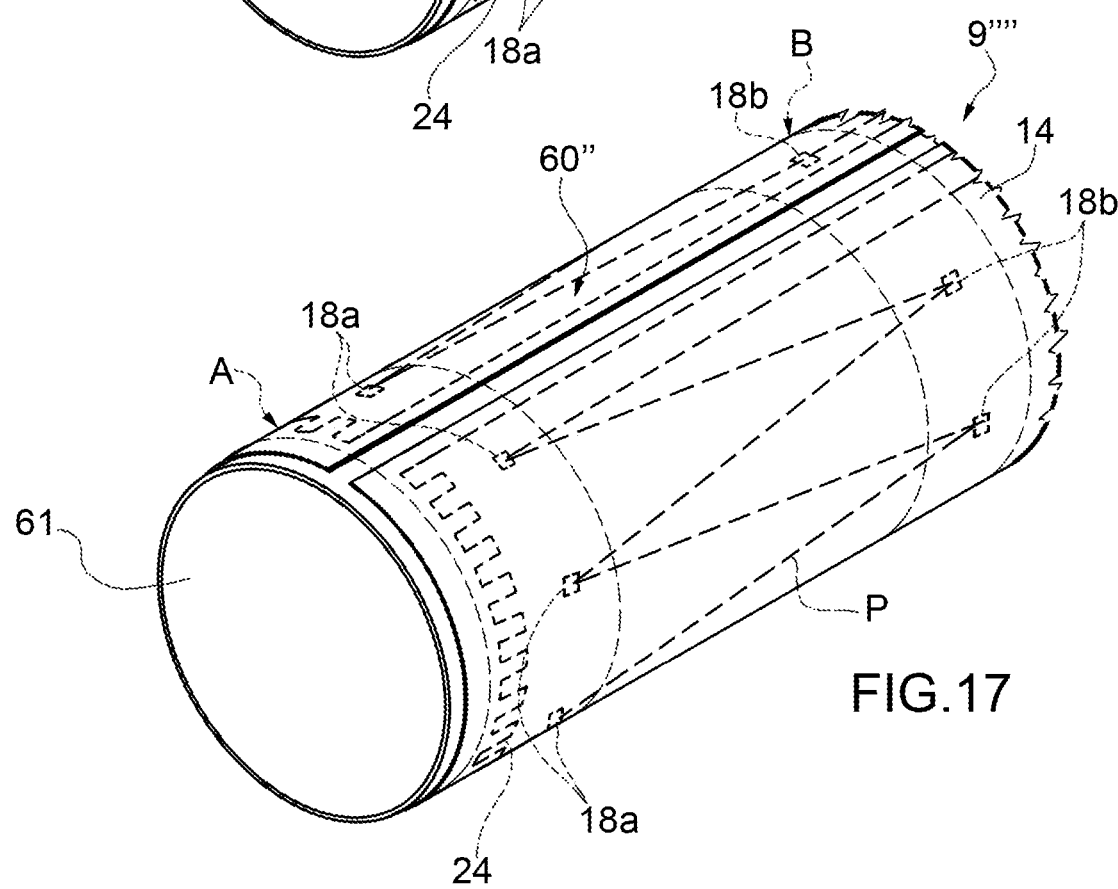
FIG. 17 is an axonometric view of a fourth variant of the sensing element according to the invention.

In FIG. 17, number 9'''' indicates a variant of the sensing element 9''' shown in FIG. 16. In FIG. 17, the elements shared with the sensing elements 9 and 9''' maintain the same reference numbers.

Similarly to what described above for the sensing element 9''', the support 14 of the sensing element 9'''' is made of a flexible material, as well.

It should be pointed out that the thermocouple junctions 18a and 18b of the example shown in FIG. 17 are all made on the inner surface of the support 14, which means that the thermocouple junctions 18a and 18b are not manufactured so as to be through junctions in the support 14 by means of vias; on the contrary, they are manufactured by simply overlapping, at their ends, the conductive tracks made of two thermoelectrically different materials, which are arranged on one single face of the support 14, by means of metallizations or with a technique known from printed circuits or from the manufacturing of thin film devices. In this case, advantageously, the flexible support 14 of the sensing element 9'''' acts as an electrically insulating material with the fixing element 1.

Advantageously, in the sensing elements 9''' and 9'''', the distribution of the thermocouple junctions 18*a* and 18*b* on the entire circumference of the areas A and B allows manufacturers to obtain a sum signal, which takes into account all the possible difference of temperature in sub-areas of the areas A and B, thus sort of averaging the temperature of the macro-areas A and B.

According to FIGS. 16 and 17, the sensing element 9''' or 9'''' comprises, furthermore, an insulating cylinder 61 made of an electrically insulating material, which is mechanically elastic or expandable. The insulating cylinder 61 is inserted into the sensing cylinder 60 and is designed to press the sensing cylinder 60 against the walls of the cavity 5 of the fixing element 1, so as to avoid the use of glues or resins for the connection of the sensing element 9''' or 9'''' itself or so as to keep the sensing element 9''' or 9'''' pressed against the fixing element 1 during the gluing step.

Preferably, the insulating cylinder 61 is made of materials having a low heat conductivity, below 1 W/mK, so as not to alter the temperature close to the areas A and B and close to the thermocouple junctions 18*a* and 18*b*.

According to variants that are not shown herein, the sensing elements 9''' and 9'''' are not provided with the insulating cylinder 61 and the respective supports 14 are directly fixed, by means of glues or resins, to the cavities 5 of respective fixing elements 1.

According to variants that are not shown herein, the sensing elements 9''' and 9'''', without the insulating cylinder, are fitted around respective fixing elements, namely they are installed on the outside of the respective fixing elements, and are properly insulated so that the detected data are not influenced by the temperatures on the outside of the fixing elements.

In FIG. 13, number 101 indicates a variant of the screw 1. The screw 101 comprises a sensing element 9, 9', 9'', 9''', 9'''', S (selected among the variants described above) inserted into the cavity 5. The screw 101 comprises, in addition to the components already described for the screw 1, which maintain the same reference numbers in FIG. 13, and as a replacement for the connector 22, an electronic device 26, which comprises, in turn, a signal treatment section 27, which is connected to the sensing element 9, 9', 9'', 9''', 9'''', S, so as to capture and reprocess the signals detected by the sensing element 9, 9', 9'', 9''', 9'''', S, a wireless communication section 29, such as a bluetooth module or a WiFi module, to transmit the digital-format signals to an external control unit 30, which is provided with (known) wireless communication means 31, a battery power supply section 33, and/or an energy harvesting section 34, such as, for example, a Peltier micro-generator.

Advantageously, the battery power supply section 33 and/or the energy harvesting section 34 can be replaced by or combined with a wireless power supply. For example, according to a variant that is not shown herein, the fixing element 1 can comprise an inductor (not shown), which is designed, in use, to face outwards; similarly, a measuring device can comprise, in turn, an inductor, which is designed to be arranged close to, namely at a distance of some millimetres from, the head of the fixing element, so as to supply power, only in that moment, to the circuits on board the fixing element 1 and, at the same time, to take care of the exchange of data and, if necessary, also of the recharging of a possible battery or electrical energy storage element.

Optionally, the electronic device 26 can comprise a memory section 28 to store the signals in digital format and/or a controlling section 32 to control possible resistors 24.

The electronic device 26 is designed to capture, store and transmit the data captured by the sensing element 9, 9', 9'', 9''', 9'''', S, so as to communicate said data to the control unit 30.

According to FIG. 13, the electronic device 26 is inserted into the head 3 in the end portion 8.

According to a variant that is not shown herein, the electronic device 26 is at least partially fixed on the outside of the screw 1; for example, the Peltier micro-generator and/or the wireless communication/power supply means and/or the energy harvesting section 34 could project outwards from the screw 1.

In FIG. 14, number 201 indicates a variant of the screw 1 in the form of a stud.

The stud 201 comprises a body 202 with a longitudinal axis L and has a substantially cylindrical shape. The stud 201 has, in a known manner, two threads f1 and f2, which are made in correspondence to the ends 203 and 204, respectively, of the body 202.

The body 202 has a longitudinal through cavity 205 with a cylindrical shape. The stud 201 comprises a sensing element 9, 9', 9'', 9''', 9'''', S (selected among the variants described above) inserted into the cavity 205. According to FIG. 14, the cavity 205 has an end portion 208, which has a larger section that allows it to house, for example, an electronic device 26 of the type described above for the screw 101. Preferably, the housing 208 is made in the area of the stud 26 that is designed to project outwards from the mechanical organ and cannot be subjected to stresses.

According to a variant that is not shown herein, the sensing element 9, 9', 9'', 9''', 9'''', S is installed on the outside of the fixing element and is properly insulated so that the detected data are not influenced by the temperatures on the outside of the fixing element.

Figure 15:
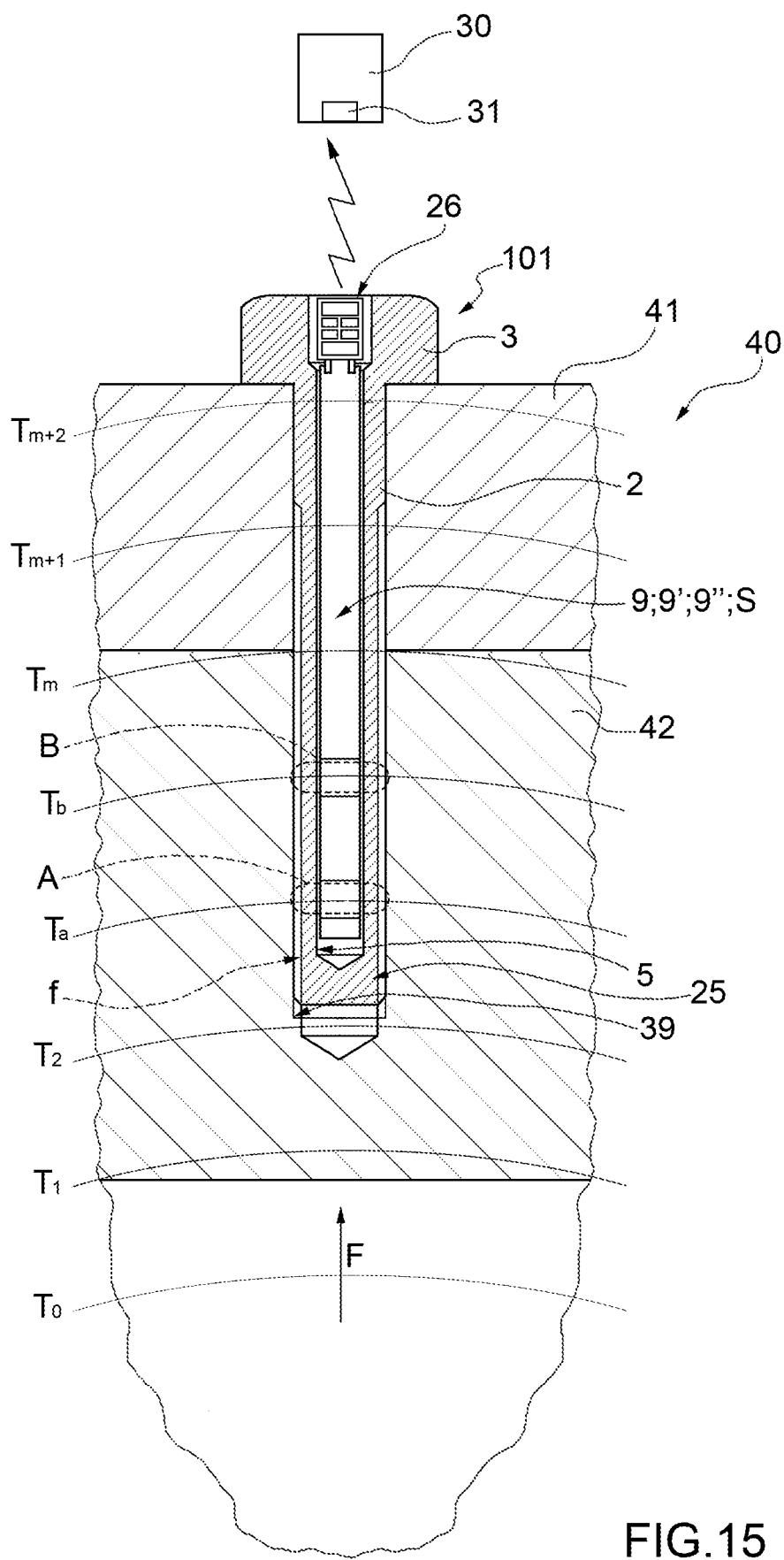
FIG. 15 is a view, with a partial section, of the first variant of the fixing element in an operating configuration.

According to FIG. 15, the fixing element, in this case the screw 101, can be installed in an already existing seat 39 of a mechanical organ 40 for the connection of two components 41, 42, which are flown through by a heat flow in the flowing direction indicate with the thermal streamline F.

In use, the sensing element 9, 9', 9'', 9''', 9'''', S provides a signal that is proportional to the difference between the temperatures Ta and Tb of the isotherms in correspondence to the areas A and B of the fixing element 1, 101, 201. In other words, according to the example shown in FIG. 15, the difference of temperature T detected with the junctions 18*a* and the junctions 18*b* is a function of the heat flow F on the inside of the mechanical organ in correspondence to the screw 101 between the areas A and B.

In particular, the microvolt voltage signal Vab outputted by the sensing element 9, 9', 9'', 9''', 9'''', S is given by the equation:

$$Vab = n*(Sc1-Sc2)*(Ta-Tb)$$

wherein:

n is the number of thermocouples 19;

Sc1 is the Seebeck coefficient a conductor of the thermocouple, for example the copper of a copper track Pcr;

Sc1 is the Seebeck coefficient the other conductor of the thermocouple, for example the constantan of a constantan track Pcc;

Ta is the temperature of the thermocouple junctions 18*a* in correspondence to the area A; and Tb is the temperature of the thermocouple junctions 18b in correspondence to the area B.

In case of constantan, the Seebeck coefficient is approximately −35 [μV/K], whereas the Seebeck coefficient of copper is approximately 6.5 [μV/K]. The choice of constantan and copper as materials used for the thermocouples 19, allows manufacturers to obtain a signal Vab of the sensing element 9, 9', 9", 9''', 9"", S that has a more uniform development, in the desired temperature range, compared to the choice of other materials.

It should be pointed out that the thermocouples 19 do not need to be supplied with power (unlike what happens with the use of resistance thermometers) in order to deliver the signal Vab concerning the difference of temperature (Ta−Tb); therefore, the use of the thermocouples 19 is particularly advantageous when the sensing element 9, 9', 9", 9''', 9"", S is supplied with power by a battery or by energy sources with a limited capacity (like in case of energy harvesting).

The detected signals Vab are sent to a control unit 30 in a wireless mode, by means of the device 26; alternatively, in case the system shown in FIG. 1 is used, the signals are sent by means of the cables 20 (for example, in case of a bench test of a mechanical organ). The control unit 30, 23 processes the signals Vab and emits alarm signals, for example in case threshold values are exceeded.

Advantageously, producing a signal concerning the difference of temperature (Ta−Tb) on the inside of the single sensing element 9, 9', 9", 9''', 9"", S allows manufacturers to obtain, in an extremely cheap, light, easy and quick manner and within small spaces, results concerning the operation of the mechanical organ 40 on which it is installed.

As a matter of fact, the inclination of the curve obtained with the detected signals Vab indicates the rapidity with which a given temperature is changing and, as a consequence, the possible thermal stress to which the mechanical organ 40 is subjected.

Furthermore, advantageously, it is possible to determine the correct tightening of the fixing element 1, 101, 201 in case of use of a sensor S comprising one or more heating elements (for example, a resistor 24 or one or more SMT resistors mounted on the dedicated pads), which are activated so as to heat one of the areas A or B. By so doing, one obtains a variation of the signal Vab (given the same environmental conditions) as a function of the exchange of heat (due to the different dissipation of heat through conduction caused by the variation of the thermal resistance between the fixing element and the mechanical organ) between the mechanical organ 40 and the fixing element 1, 101, 201. In other words, when using a sensor of the type S", it is possible to use the signal Vab, when the resistor 24 is activated, to determine the correct tightening (or lack thereof) of the fixing element 1, 101, 201 in the mechanical organ 40. Obviously, the same also applies to all the other solutions mentioned above and not shown herein, which involve the application of resistors.

The sensors S, Sb, S' e S" described above have, furthermore, the following advantages: high repeatability and stability in time; low consumption of energy (for the sensors without heaters); a good linearity in the range of temperatures of use; and relatively low costs.

According to a variant that is not shown herein, the fixing element comprises, instead of the sensing element 9 or 9', a pair of absolute temperature detectors, such as, for example, Pt100 or Pt1000 resistance thermometers (generally known as resistance temperature detectors—RTD). However, a system of this type involves manufacturing costs that are greater than those of a sensing element 9, 9', 9", 9''', 9"", S like the one described above and resistance thermometers need to be supplied with power (increase of consumptions and costs).

According to a variant that is not shown herein, a sensing element 9, 9', 9", 9''', 9"", S comprises, as a heating element, a resistance thermometer, in particular a Pt100 or Pt1000 resistance thermometer. To this regard, it should be pointed out that a Pt100 or Pt1000 resistance thermometer is a resistor that varies its resistive value based on the temperature and can also act as a heater, if it is properly supplied with power, namely with powers of at least 10 mW, preferably with powers ranging from 50 mW to 1 W. Therefore, the addition of a resistance thermometer, in particular a Pt100 or Pt1000 resistance thermometer, besides enabling the measurement of the thermal gradient indicated above, also allows the sensing element 9, 9', 9", 9''', 9"", S to measure the absolute temperature in the areas A and B and to detect the unscrewing. It is possible to adopt an electronic control, which allows the resistance thermometer to be alternatively used as a heater or as an absolute temperature measurer. Therefore, if a sensor S comprises a resistance thermometer acting as a heating element, the resistance thermometer can be supplied with power so as to cause it to alternatively work as a heater or as an absolute temperature detector in the area A or B.

Obviously, the sensing element 9, 9', 9", 9''', 9"", S can be fitted on the inside or on the outside of fixing elements other than the screw 1, 101 and the stud 201 (such as tie rods or the like).

The use of the fixing element (such as the screw 1, 101 or the stud 201) allows the sensing element 9, 9', 9", 9''', 9"", S to be positioned close to a mechanical organ 40 to be controlled, for example an engine/components of automatic machines/kinematic couplings, using seats 39 that are usually already available in the mechanical organs 40 themselves. Furthermore, the fixing elements 1, 101, 201 according to the invention have standard dimensions and can replace similar fixing elements that are already being used. By so doing, the fixing element 1, 101, 201 can also be installed on the inside of already existing mechanical organs 40 minimizing installation times and costs, if necessary as a replacement for fixing elements that are already being used. Moreover, given the extremely small dimensions of the sensing element 9, 9', 9", 9''', 9"", S, the volume and the weight of the fixing element 1, 101, 201 can be reduced to a minimum.

The fixing elements 1, 101, 201 made of the materials indicated above (titanium; nickel-chromium alloys generally known as INCONEL®; X1CrNiMoAlTi12-11-2 stainless steel generally known as MLX17®; X1NiCrMoAlTi12-10-2 stainless steel generally known as MLX19®; precipitation-hardening stainless steel comprised between 13-8 or 15-5 or 17-4; steel with composition Si, 19.00-21.00 Cr, 33.00-37.00 Ni, 9.00-11.00 Mo, 1.00 max. Ti, 0.01 B, 1.00 max Fe, Bal Co generally known as MP35N®; steel comprising nickel and cobalt generally known as MARAGING® and/or VASCOMAX®, for example MARAGING300 or AERMET®100; AISI4340 and AISI304 steel) feature small weights and, at the same time, a high mechanical resistance. Therefore, fixing elements 1, 101, 201 made of one of the materials indicated above can be used in mechanical organs that require a reduction of the weights and/or of the dimensions, ensuring at the same time a high mechanical resistance, which is what happens in aeronautical applications or in application for sports/racing cars.

Moreover, the use of the materials indicated above allows manufacturers to lighten the inside of the fixing elements 1, 101, 201, so as to be able to install the sensing element 9, 9', 9", 9'", 9"", S and, at the same time, ensure the mechanical resistance of the fixing element 1, 101, 201 despite the inner lightening cavity 5. Obviously, the maximum shapes and dimensions of the lightening cavity 5 are established as a function of the designing data, in particular the maximum load and the stress resistance to be ensured by the fixing element 1, 101, 201.

The invention claimed is:

1. A fixing element comprising a body, which is cylindrical and has a longitudinal axis, and a sensing element, which detects a difference of temperature between a first area and a second area of said body; wherein said first area and second area are spaced apart along the longitudinal axis of the fixing element, wherein said body comprises a cavity extending along the longitudinal axis of the body and having a cross-section with a circular shape, said cavity housing said sensing element; wherein said sensing element comprises, in turn, a first conductor and a second conductor, which are connected to one another in correspondence to a first thermocouple junction and a second thermocouple junction in correspondence to the first and, respectively, the second area of said body; wherein the first thermocouple junction and the second thermocouple junction detect a signal concerning the difference of temperature between said first and second area; wherein, the sensing element comprises a support, which is made of a flexible material; wherein the support is bent so as to form a sensitive cylinder inserted in said cavity of the fixing element; wherein said first thermocouple junction and said second thermocouple junction are formed on the support so as to be arranged in correspondence to the first area and the second area, respectively.

2. A fixing element according to claim 1, wherein the assembly made up of the first conductor and the second conductor and of the first thermocouple junction and the second thermocouple junction is a thermocouple; wherein the sensing element comprises a plurality of thermocouples, which are connected to one another in series and detect the difference of temperature between the first area and the second area of said body.

3. A fixing element according to claim 1, wherein the sensing element comprises one or more heat conductor areas, each arranged in correspondence to a respective one of the first area or second area.

4. A fixing element according to claim 1, wherein the sensing element comprises a multilayer sensor.

5. A fixing element according to claim 1 and comprising a resistor, which is arranged in correspondence to one or more of the first and second thermocouple junctions.

6. A fixing element according to claim 5, wherein the resistor is a thermometer resistive temperature detector, which is configured to be used as a heater and/or measurer.

7. A fixing element according to claim 1, wherein the sensing element comprises electrically insulating material, which is inserted into said cavity and is configured to electrically insulate said first and second conductors from one another.

8. A fixing element according to claim 1, and comprising an electronic device, which comprises, in turn:
   a signal treatment section, which is connected to said sensing element, so as to capture and reprocess signals detected by said sensing element; and
   a wireless communication section to transmit the signals to an external control unit, which is provided with wireless communication means.

9. A fixing element according to claim 8, wherein the electronic device comprises one or more of the following sections to be chosen: a memory section to store the signals; a controlling section to control possible resistors; a battery power supply section; and an energy harvesting section.

10. A method to detect heat flow on the inside of a mechanical organ by means of a fixing element according to claim 1; the method comprising the steps of:
    installing said fixing element on the mechanical organ;
    detecting said signals proportional to the difference of temperature between the first and the second area of said body of the fixing element during the operation of the mechanical organ;
    communicating said signals to a control unit; and
    processing said signals by means of the control unit.

11. A method according to claim 10, wherein the sensing element comprises one thermocouple or different thermocouples, which are connected to one another in series; each thermocouple being configured to detect the difference of temperature between the first and the second area of said body; wherein, during the detecting step, the signal detected by the sensing element is given by the following equation:

$$Vab = n*(Sc1-Sc2)*(Ta-Tb)$$

wherein:
n is the number of thermocouples of the sensing element;
Sc1 is the Seebeck coefficient of the first conductor of the thermocouple;
Sc2 is the Seebeck coefficient of the second conductor of the thermocouple;
Ta is the temperature of the first thermocouple junction in correspondence to the first area; and
Tb is the temperature of the second thermocouple junction in correspondence to the second area.

12. A method according to claim 11, wherein the sensing element comprises a heating means, which is supplied with an electric power and is arranged in correspondence to a thermocouple junction; wherein, during the detecting step, the temperature of the respective thermocouple junction at least partly depends on the electrical power supplied to said heating means.

13. A method of detecting a temperature difference by means of claim 1;
    The method comprising the step of:
    detecting the difference of temperature between the first area and the second area of the fixing element with the sensing element.

* * * * *